United States Patent
Thomassey et al.

(10) Patent No.: US 12,385,549 B2
(45) Date of Patent: Aug. 12, 2025

(54) MECHANICAL DRIVE DEVICE PROVIDED WITH A TORQUEMETER WITH A PHONIC WHEEL, GEARBOX PROVIDED WITH SUCH A MECHANICAL DRIVE DEVICE AND AIRCRAFT

(71) Applicant: AIRBUS HELICOPTERS, Marignane (FR)

(72) Inventors: Lionel Thomassey, Fos sur Mer (FR); Antoine Guillemin, Saint-Chamas (FR); Natacha Laborde, Pelissanne (FR)

(73) Assignee: AIRBUS HELICOPTERS, Marignane (FR)

( * ) Notice: Subject to any disclaimer, the term of this patent is extended or adjusted under 35 U.S.C. 154(b) by 339 days.

(21) Appl. No.: 18/135,480

(22) Filed: Apr. 17, 2023

(65) Prior Publication Data

US 2023/0400086 A1    Dec. 14, 2023

(30) Foreign Application Priority Data

Jun. 8, 2022 (FR) .................... 2205503

(51) Int. Cl.
*G01L 3/04* (2006.01)
*B64C 27/14* (2006.01)
(Continued)

(52) U.S. Cl.
CPC .............. *F16H 1/20* (2013.01); *B64C 27/14* (2013.01); *F16D 11/14* (2013.01); *F16H 57/045* (2013.01); *G01L 3/04* (2013.01)

(58) Field of Classification Search
CPC ......... F16H 1/20; F16H 57/045; B64C 27/14; F16D 11/14; G01L 3/04; G01L 3/109; B64D 35/00
See application file for complete search history.

(56) References Cited

U.S. PATENT DOCUMENTS

| | | | |
|---|---|---|---|
| 4,150,566 A | 4/1979 | Loebel et al. | |
| 6,782,766 B2 * | 8/2004 | Parkinson | G01L 3/109 |
| | | | 73/862.328 |

(Continued)

FOREIGN PATENT DOCUMENTS

| | | |
|---|---|---|
| FR | 2373044 A1 | 6/1978 |
| FR | 3032525 A1 | 8/2016 |
| WO | 2009141261 A1 | 11/2009 |

OTHER PUBLICATIONS

French Search Report for French Application No. FR2205503, Completed by the French Patent Office, Dated Jan. 11, 2023, 9 pages.

*Primary Examiner* — Freddie Kirkland, III
(74) *Attorney, Agent, or Firm* — BROOKS KUSHMAN P.C.

(57) ABSTRACT

A mechanical device comprising an input pinion, an intermediate shaft and a terminal pinion that are coaxial and are able to rotate about a rotation axis, as well as a torquemeter with a phonic wheel provided with a reference shaft connected by a distal end to the intermediate shaft, measuring indexes arranged at a proximal end of the intermediate shaft and reference indexes arranged at a proximal end of the reference shaft. A first mechanical connection connects the input pinion and the intermediate shaft. A second mechanical connection connects a first distal end of the intermediate shaft and the terminal pinion and comprises series of first teeth arranged on the distal end and second teeth arranged on the terminal pinion, and a drive ring comprising a series of connecting teeth cooperating with the first and second teeth.

17 Claims, 5 Drawing Sheets

(51) Int. Cl.
  *F16D 11/14*    (2006.01)
  *F16H 1/20*     (2006.01)
  *F16H 57/04*    (2010.01)

(56) References Cited

U.S. PATENT DOCUMENTS

| | | | |
|---|---|---|---|
| 9,625,332 B2 * | 4/2017 | Saito | G01L 3/104 |
| 9,841,333 B2 | 12/2017 | Ehinger et al. | |
| 11,204,087 B2 * | 12/2021 | Garabello | F02C 3/107 |
| 2011/0056309 A1 | 3/2011 | Cazaux et al. | |
| 2015/0211380 A1 | 7/2015 | Curlier et al. | |
| 2016/0195442 A1 | 7/2016 | Saito et al. | |
| 2020/0003290 A1 | 1/2020 | Garabello et al. | |

\* cited by examiner

MECHANICAL DRIVE DEVICE PROVIDED WITH A TORQUEMETER WITH A PHONIC WHEEL, GEARBOX PROVIDED WITH SUCH A MECHANICAL DRIVE DEVICE AND AIRCRAFT

CROSS-REFERENCE TO RELATED APPLICATIONS

This application claims priority to French patent application No. FR 2205503 filed on Jun. 8, 2022, the disclosure of which is incorporated in its entirety by reference herein.

TECHNICAL FIELD

The present disclosure lies in the field of power transmission devices.

The present disclosure relates to a mechanical drive device provided with a torquemeter with a phonic wheel, as well as a gearbox for an aircraft provided with such a mechanical drive device and an aircraft comprising such a gearbox.

BACKGROUND

A mechanical rotational drive device is used to transmit mechanical torque and therefore power between two rotating components, for example between an input pinion and a terminal pinion.

Such a mechanical drive device may be arranged between a drive system, such as an engine, connected to the input pinion by means of a first toothed wheel, for example, and a driven system, such as a rotor, connected to the terminal pinion by means of a second toothed wheel, for example.

Such a mechanical drive device may also be arranged in a mechanical system positioned between a drive system and a driven system. A mechanical system is, for example, a mechanical gearbox of an aircraft positioned between one or more engines and one or more rotors.

This mechanical system may comprise one or more gear ratio stages comprising, for example, gears, pinions and/or toothed wheels. Such a mechanical drive device may be arranged between two gear ratio stages of the mechanical system.

Moreover, it is sometimes useful or even necessary to know the mechanical torque transmitted by a mechanical drive device. For this purpose, a mechanical drive device may comprise a torquemeter providing information on the mechanical torque transmitted between the input pinion and the terminal pinion. Such a torquemeter may be a torquemeter with a phonic wheel, for example.

A torquemeter with a phonic wheel provides a measurement of the transmitted torque by comparing the position of a drive shaft subjected to this torque and therefore susceptible to deformation with the position of a reference shaft rotating coaxially and synchronously with the drive shaft but without being subjected to this torque. For this purpose, one end of the reference shaft is securely fastened to the drive shaft, preferably in the vicinity of the mechanical connection between the drive shaft and the input or terminal pinion. The other end of the reference shaft comprises indexes, for example teeth or holes. The drive shaft also comprises indexes at one of its ends opposite the connection with the reference shaft, and preferably in the vicinity of the mechanical connection between the drive shaft and the input or terminal pinion.

The indexes of the drive shaft and the reference shaft are generally located at the same level so that they can be detected by the same sensor when the drive and reference shafts rotate. The drive shaft will undergo torsion under the effect of the transmitted mechanical torque between the respective connections to the input and terminal pinions. In this torsion the indexes of this drive shaft become angularly offset from the indexes of the reference shaft, which does not undergo such torsion.

As these shafts rotate, a sensor can detect when these indexes move past each other and transmit information relating to these movements to a calculator so that the calculator can deduce the transmitted torque according to a predetermined law.

In order to obtain an accurate measurement of the torque, the angular offset between the indexes must be significant, being a few degrees at the very least, for example. Consequently, the working length of the drive shaft subject to torsional deformation must be considerable. This working length of the drive shaft is in particular defined in terms of the torque values to be measured by the torquemeter. The arrangement of a long drive shaft can be challenging.

Furthermore, the mechanical connection between the drive shaft and the input or terminal pinion, which is located opposite the indexes, is therefore positioned close to or at the end of the drive shaft. Therefore, together with the dimensions of the drive shaft, the dimensions of this mechanical connection help determine the dimensions of the mechanical drive device and, in particular, the space requirement of this mechanical drive device along its rotation axis.

Moreover, the space requirement of a mechanical gearbox may be an important and non-optional parameter, especially when the mechanical gearbox is fitted to a vehicle and, in particular, an aircraft. As a result, using a mechanical drive device provided with a torquemeter with a phonic wheel in such a mechanical gearbox may prove to be complex.

Furthermore, when the dimensions of the mechanical gearbox are restricted, the dimensions of the mechanical connection between the drive shaft and the input or terminal pinion may dictate that this mechanical connection be located close to or below the level of a lubricating liquid in the mechanical gearbox, thus giving rise to a splashing phenomenon that may be detrimental to the operation of this mechanical connection, for example by causing the parts of the mechanical connection to expand on contact with the lubricating liquid, which is hotter than the temperature inside the mechanical gearbox.

The technological background of the disclosure includes documents US 2016/0195442, US 2020/0003290, U.S. Pat. No. 9,841,333, FR 2 373 044, WO 2009/141261, FR 3 032 525 and US 2015/0211380.

SUMMARY

The aim of the present disclosure is therefore to propose an alternative solution for mechanically driving the components of such a mechanical drive device, aimed at limiting the axial space requirement of the mechanical drive device.

For example, the object of the present disclosure is a mechanical device comprising an input pinion and a terminal pinion that are able to rotate about a rotation axis AX, an intermediate shaft extending longitudinally along the rotation axis from a first proximal end to a first distal end, a first mechanical rotational drive connection connecting the intermediate shaft and the input pinion, a second mechanical connection connecting the first distal end of the intermediate shaft and the terminal pinion, the mechanical device comprising a torquemeter cooperating with the intermediate shaft.

The mechanical device according to the disclosure is remarkable wherein the torquemeter is a torquemeter with a phonic wheel provided with a reference shaft extending longitudinally along the rotation axis AX from a second proximal end to a second distal end, the reference shaft being arranged at least partially inside the intermediate shaft and being coaxial to the intermediate shaft, the second distal end of the reference shaft being connected to the intermediate shaft, the torquemeter comprising at least one measuring index secured to the intermediate shaft and arranged at the first proximal end and at least one reference index secured to the reference shaft and arranged at the second proximal end.

The mechanical device according to the disclosure is also remarkable wherein the intermediate shaft is coaxial with the input pinion and with the terminal pinion about the rotation axis AX and the second mechanical rotational drive connection comprises a series of first teeth arranged on the first distal end of the intermediate shaft and a series of second teeth arranged on the terminal pinion, around the first teeth with respect to the rotation axis AX, a drive ring comprising a series of connecting teeth separated by radial intertooth spaces, each first tooth and each second tooth being in contact with the connecting teeth in a radial intertooth space, and a fastening device connecting the drive ring axially along the rotation axis AX with the intermediate shaft and the terminal pinion.

Therefore, the input pinion and the terminal pinion are connected mechanically in rotation about the rotation axis AX via the first mechanical rotational drive connection, the intermediate shaft and the second mechanical connection.

The first mechanical rotational drive connection may be a permanent or non-permanent mechanical connection, for example being disengageable. The input pinion and the intermediate shaft are thus driven synchronously and coaxially about the rotation axis AX via the first mechanical rotational drive connection.

The second mechanical drive connection is a permanent mechanical connection. The terminal pinion and the intermediate shaft are thus driven synchronously and coaxially about the rotation axis AX via the second mechanical connection.

Installing the torquemeter in the mechanical device according to the disclosure makes it possible to know the mechanical torque transmitted between the input pinion and the terminal pinion at all times.

The drive ring of the second mechanical connection is annular in shape around the rotation axis AX and therefore comprises a hole through its center. The drive ring allows mechanical torque to be transmitted between the intermediate shaft and the terminal pinion via the first teeth, the second teeth and the connecting teeth. Each first tooth extends parallel to the rotation axis AX from a tooth root to a tooth crest. Similarly, each connecting tooth extends parallel to the rotation axis AX from a tooth root to a tooth crest. For each tooth, the tooth root connects that tooth to the body of the part comprising that tooth, namely the body of the intermediate shaft in the case of a first tooth and the body of the drive ring in the case of a connecting tooth. A tooth crest is the free end of a tooth.

The first teeth arranged on the first distal end of the intermediate shaft cooperate and are in contact with the connecting teeth of the drive ring. Each first tooth is situated in a radial intertooth space between two connecting teeth while being in contact with these two connecting teeth. The first teeth and the connecting teeth are thus interlocked axially, parallel to the rotation axis AX, and not radially as in the case of a gearing between a pinion and a toothed wheel or with splines, for example. The mechanical torque is thus transmitted between the intermediate shaft and the drive ring.

The second teeth arranged on the terminal pinion cooperate and are in contact with the connecting teeth of the drive ring. The second teeth are situated outside the first teeth with respect to the rotation axis AX. As with the first teeth, each second tooth extends parallel to the rotation axis AX from a tooth root to a tooth crest. Each second tooth is situated in a radial intertooth space between two connecting teeth while being in contact with these two connecting teeth. The second teeth and the connecting teeth are therefore also interlocked axially, parallel to the rotation axis AX. The mechanical torque is thus transmitted between the drive ring and the terminal pinion.

The intermediate shaft, the drive ring and the terminal pinion are thus driven synchronously and coaxially about the rotation axis.

A fastening device establishes an axial connection along the rotation axis AX between the drive ring, the intermediate shaft and the terminal pinion, thus keeping the first and second teeth in radial intertooth spaces between two connecting teeth.

In this second mechanical connection, there is no relative movement between the first teeth and the connecting teeth and between the second teeth and the connecting teeth, in particular because the drive ring, the intermediate shaft and the terminal pinion are clamped together axially by the fastening device.

As a result, the rotation of the input pinion can cause the terminal pinion to rotate synchronously and coaxially with the input pinion, depending on the type of first mechanical rotational drive connection used. The input pinion is connected via a toothed wheel or a reduction device to a drive system such as an engine, for example. The terminal pinion is connected via a toothed wheel or a reduction device to a driven system, such as a rotor, for example.

The mechanical device according to the disclosure makes it possible, in particular, to transmit rotational movement and mechanical torque between the input pinion and the terminal pinion with a minimal axial space requirement, in particular by virtue of the second mechanical connection, while allowing a high amount of mechanical torque to be transmitted.

The mechanical device according to the disclosure may comprise one or more of the following features, taken individually or in combination.

According to one possibility, the first mechanical rotational drive connection may be a permanent connection. For example, the first mechanical connection may comprise one or more keys, pins or splines.

Alternatively, the first mechanical rotational drive connection may be a disengageable connection.

For example, the first mechanical connection may comprise a free-wheel that only allows the terminal pinion to be driven by the input pinion, the input pinion then being connected to a drive system and the terminal pinion being connected to a driven system.

The first mechanical rotational drive connection may alternatively comprise a free-wheel that only allows the input pinion to be driven by the terminal pinion in a single direction of rotation about the rotation axis AX. The terminal pinion is then connected to a drive system and the input pinion is connected to a driven system.

According to another possibility compatible with the preceding possibilities, the first teeth and the second teeth may be convex and the connecting teeth may be concave in a plane perpendicular to the rotation axis AX. The first teeth and the second teeth are identical in shape, the shape of the connecting teeth being complementary to the shapes of the first and second teeth. As a result, contacts between the first teeth and the connecting teeth, and between the second teeth and the connecting teeth, occurs on a surface that allows a high amount of mechanical torque to be transmitted, while limiting wear or burring of the first teeth, the second teeth and the connecting teeth. These shapes of the first teeth, the second teeth and the connecting teeth also advantageously ensure that the intermediate shaft and the terminal pinion are coaxial.

Alternatively, the first teeth and the second teeth may be concave and the connecting teeth may be convex in a plane perpendicular to the rotation axis AX. The first teeth and the second teeth are identical in shape, the shape of the connecting teeth being complementary to the shapes of the first and second teeth.

For example, the first teeth, the second teeth and the connecting teeth are Curvic® teeth.

According to another possibility compatible with the preceding possibilities, each intertooth space may receive a first tooth and a second tooth, each intertooth space longitudinally facing a first tooth and a second tooth. The mechanical torque transmitted between the intermediate shaft and the terminal pinion can then be maximized.

According to another possibility compatible with the preceding possibilities, the first teeth, the second teeth and the connecting teeth may each extend in azimuth with respect to the rotation axis AX between two inclined faces. Each of the faces is thus inclined by an angle of between 5 and 15 degrees (5° and 15°) in relation to a direction parallel to the rotation axis AX. Specifically, the intersection of these flanks with a plane parallel to the rotation axis and tangent to a circle centered on the rotation axis AX forms an angle of between 5° and 15° with a straight line of this plane parallel to the rotation axis AX.

This angle of between 5° and 15° is, for example, smaller than the angle conventionally used for Curvic® transmission systems, which is of the order of 30°. This small angle makes it possible to increase the number of teeth carried by the drive ring, the intermediate shaft and the terminal pinion at the second mechanical connection.

According to another possibility compatible with the preceding possibilities, each connecting tooth may radially comprise two teeth separated by a separation space, the two teeth comprising an inner connecting tooth and an outer connecting tooth, the outer connecting teeth being situated around the inner connecting teeth with respect to the rotation axis AX. The inner connecting teeth thus cooperate with the first teeth and the outer connecting teeth cooperate with the second teeth.

The inner connecting teeth thus cooperate only with the first teeth, whereas the outer connecting teeth cooperate only with the second teeth, the inner connecting teeth being situated between the outer connecting teeth and the rotation axis AX. The separation space comprises an arc-shaped groove centered on the rotation axis AX.

According to another possibility compatible with the preceding possibilities, the fastening device may comprise a screw and a nut, the screw comprising a threaded outer cylindrical surface cooperating with a tapped inner cylindrical surface of the intermediate shaft, the drive ring being arranged between the screw and the intermediate shaft, the nut comprising a tapped inner cylindrical surface cooperating with a threaded outer surface of the terminal pinion, the drive ring being arranged between the nut and the terminal pinion.

This fastening device thus makes it possible to hold the drive ring, the intermediate shaft and the terminal pinion axially along the rotation axis AX despite the axial forces that may occur at the first teeth, the second teeth and the connecting teeth.

According to another possibility compatible with the preceding possibilities, the torquemeter may comprise a sensor and a calculator, the sensor being configured to measure relative angular positions of said at least one measuring index and said at least one reference index with respect to the rotation axis AX, the calculator being configured to determine a mechanical torque transmitted between the input pinion and the terminal pinion as a function of the relative angular positions. The torquemeter may be calibrated to determine the thermal expansions of the components of the mechanical device according to the disclosure occurring during operation of the mechanical device and to take these thermal expansions into account in order to determine their effects on the relative angular positions of said at least one measuring index and said at least one reference index, and consequently on the measured torque values.

The calculator may, for example, be configured to apply a predetermined law, established by testing or simulation, for example, linking said relative angular positions and the mechanical torque transmitted between the input gear and the terminal pinion. This predetermined law takes into account, in particular, the thermal expansions of the components of the mechanical device.

According to another possibility compatible with the preceding possibilities, said at least one measuring index and said at least one reference index may be arranged in a first plane P perpendicular to the rotation axis AX. In this way, a single sensor can detect when said at least one measuring index and said at least one reference index move past each other and can deduce therefrom relative angular positions of said at least one measuring index and said at least one reference index, and consequently an angular offset between a measuring index and a reference index.

According to another possibility compatible with the preceding possibilities, the intermediate shaft may be arranged at least partially inside the input pinion and the terminal pinion.

According to another possibility compatible with the preceding possibilities, the reference shaft may be connected to the intermediate shaft by a flush-mounted connection with zero degrees of freedom, comprising, for example, at least one key, at least one pin or splines or a shrink-fit arrangement.

The present disclosure also relates to a gearbox comprising a mechanical device as previously described. The gearbox comprises a housing in which the mechanical device is arranged and at the bottom of which there is a lubricating liquid. The second mechanical connection is positioned above the lubricating liquid when the gearbox is in a reference position.

Indeed, since there is no relative movement between the first teeth and the connecting teeth and between the second teeth and the connecting teeth, the second mechanical connection requires no lubrication. Furthermore, despite the considerable minimum length of the intermediate shaft that is necessary in order to allow an accurate measurement of the transmitted torque, the small axial space requirement of the second mechanical connection prevents this second mechanical connection from being situated below the level of the lubricating liquid, and therefore at least partially in the lubricating liquid, thus also preventing the second mechanical connection from splashing in the lubricating liquid.

The reference position is, for example, a horizontal position of the gearbox in a terrestrial reference frame, for example when a vehicle comprising this gearbox is standing on horizontal ground.

The present disclosure finally relates to an aircraft comprising a gearbox as previously described, the gearbox being arranged between at least one engine and at least one rotor of the aircraft.

Such an aircraft may, for example, be a rotary-wing aircraft comprising one or more engines and one or more rotors, such as a lift rotor and an auxiliary anti-torque rotor, as well as a gearbox allowing

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
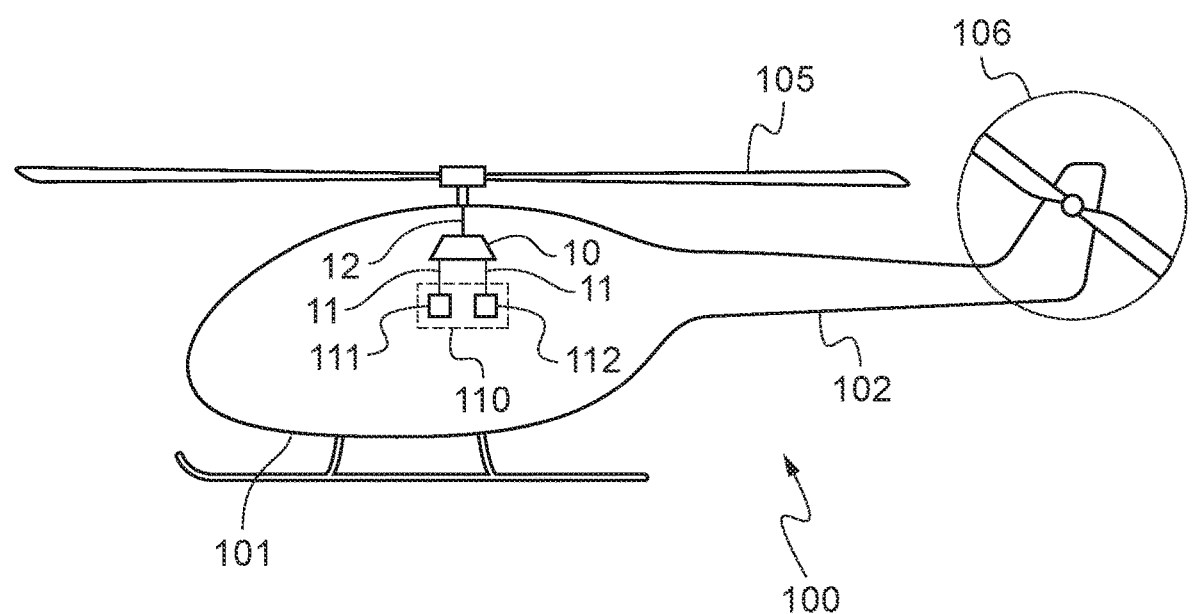
FIG. 1 shows an aircraft according to the disclosure.

FIG. 1 shows a rotary-wing aircraft 100 such as a rotorcraft. This aircraft 100 may comprise an airframe 101, a main rotor 105 providing at least partial lift for the aircraft 100 and, possibly, an auxiliary rotor 106 arranged at the end of a tail boom 10, as well as a gearbox 10. The gearbox 10 is rotated by a power plant 110 provided with at least one engine 111, 112 and rotates the main rotor 105 and possibly the auxiliary rotor 106, thus allowing mechanical power to be transmitted from the engine or engines 111, 112 to the main rotor 105 and, possibly, to the auxiliary rotor 106.

For example, and in this context, the gearbox 10 comprises at least one input shaft 11 connected to the power plant 110 and one mast 12 connected to the main rotor 105. An output shaft (not shown) of the gearbox 10 may also be connected to the auxiliary rotor 106.

Figure 2:
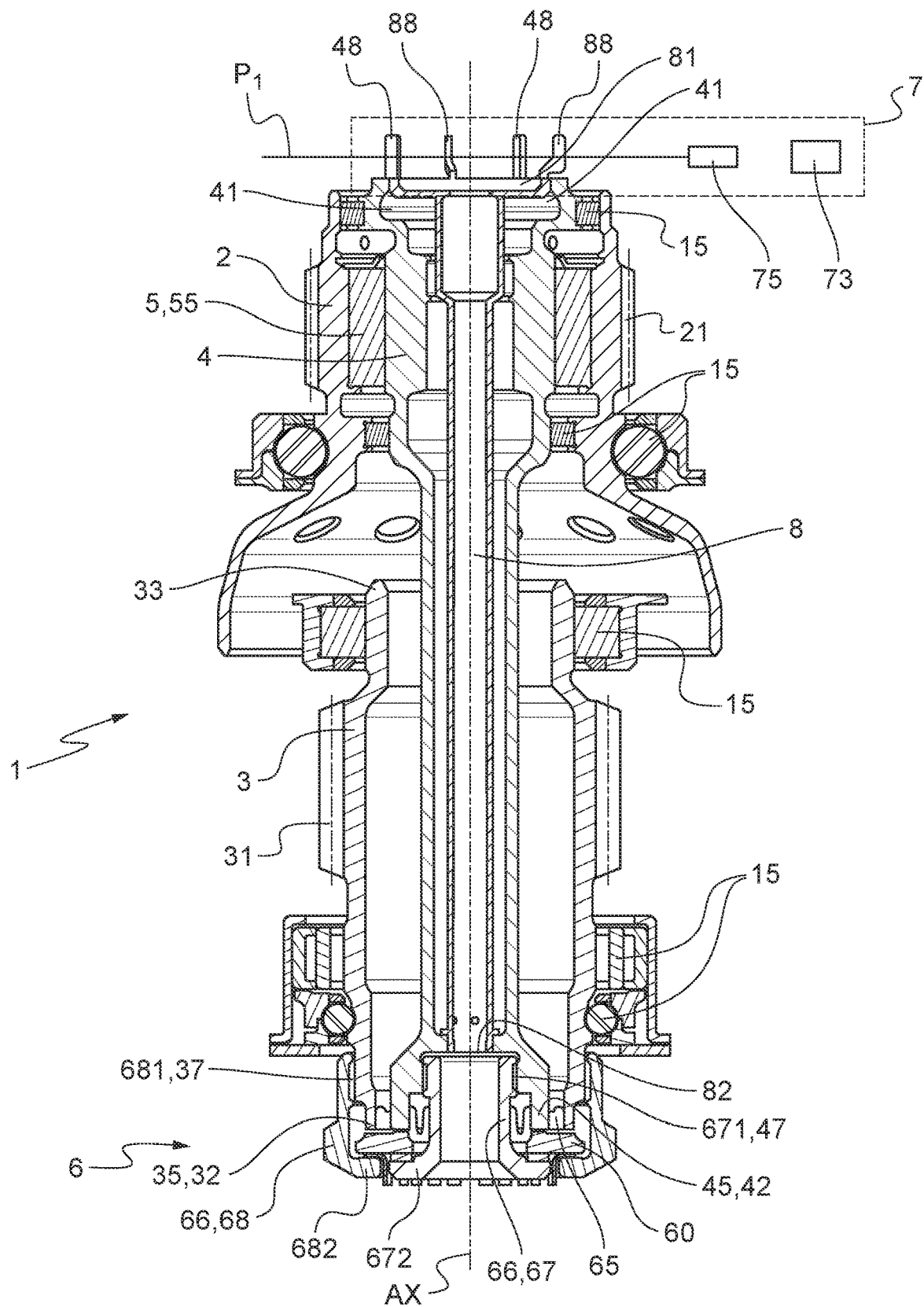
FIG. 2 is a cross-sectional view of a mechanical device according to the disclosure.

The gearbox 10 may comprise one or more gear ratio stages provided with gears, pinions and/or toothed wheels, for example. The gearbox 10 may also comprise a mechanical device 1 arranged, for example, between two gear ratio stages. A cross-sectional view of this mechanical device 1 is shown in FIG. 2.

The mechanical device 1 may alternatively be arranged in any mechanical system provided with pinions and/or toothed wheels and fitted, for example, in a vehicle or a machine.

The mechanical device 1 comprises an input pinion 2 and a terminal pinion 3 that are able to rotate about a rotation axis AX. The rotation axis AX is situated in the cutting plane of the view shown in FIG. 2. The input pinion 2 comprises teeth 21 that may, for example, be connected to a drive system via a toothed wheel or a reduction device. The terminal pinion 3 comprises teeth 31 that may be connected to a driven system via a toothed wheel or a reduction device.

According to the example shown in the figures, the input pinion 2 may be connected via two toothed wheels to the two input shafts 11 and, consequently, to the two engines 111, 112 of the power plant 110, while the terminal pinion 3 may be connected via a reduction gear to the mast 12 and, consequently, to the rotor 105, 106.

Alternatively, the input pinion 2 and the terminal pinion 3 may be swapped around, in which case the terminal pinion 3 may be connected to at least one input shaft 11 and then to a drive system while the input pinion 2 may be connected to a mast 12 and then to a driven system.

The mechanical device 1 also comprises an intermediate shaft 4 extending longitudinally along the rotation axis AX from a first proximal end 41 to a first distal end 42. The intermediate shaft 4 extends at least partially inside the input pinion 2 and the terminal pinion 3, being coaxial with the input pinion 2 and with the terminal pinion 3, around the rotation axis AX.

The mechanical device 1 comprises rotational guide devices 15 such as ball or roller bearings, for example. For example, such rotational guide devices 15 are arranged between the input pinion 2 and the intermediate shaft 4, between the input pinion 2 and the terminal pinion 3, between a frame (not shown for the sake of clarity in FIG. 2) of the mechanical device 1 and the input pinion 2, and between this frame and the terminal pinion 3. The tracks of these rotational guide devices 15 may be integrated into these components 2, 3, 4 of the mechanical device 1 or may be attached to them, these rotational guide devices 15 then comprising an inner ring and/or an outer ring, for example.

The mechanical device 1 also comprises a first mechanical rotational drive connection 5, a second mechanical connection 6 and a torquemeter 7.

The first mechanical rotational drive connection 5 secures the input pinion 2 and the intermediate shaft 4 at least rotationally about the rotation axis AX, preferably in the vicinity of the first proximal end 41. The first mechanical rotational drive connection 5 may be a permanent connection, meaning that the input pinion 2 and the terminal pinion 3 are permanently connected to each other, at least rotationally. In this case, the first mechanical connection 5 may comprise splines or one or more keys or indeed one or more pins, for example. The first mechanical connection 5 may also be a flush-mounted connection with zero degrees of freedom.

Alternatively, the first mechanical rotational drive connection 5 may be a disengageable connection. For example, the first mechanical connection 5 may comprise a free-wheel 55, an inner part of the free-wheel 55 being connected to the intermediate shaft 4 and an outer part of the free-wheel 55 being connected to the input pinion 2. For example, the free-wheel 55 only allows the terminal pinion 4 to be driven by the input pinion 2 in a single direction of rotation about the rotation axis AX.

Figures 3, 4:
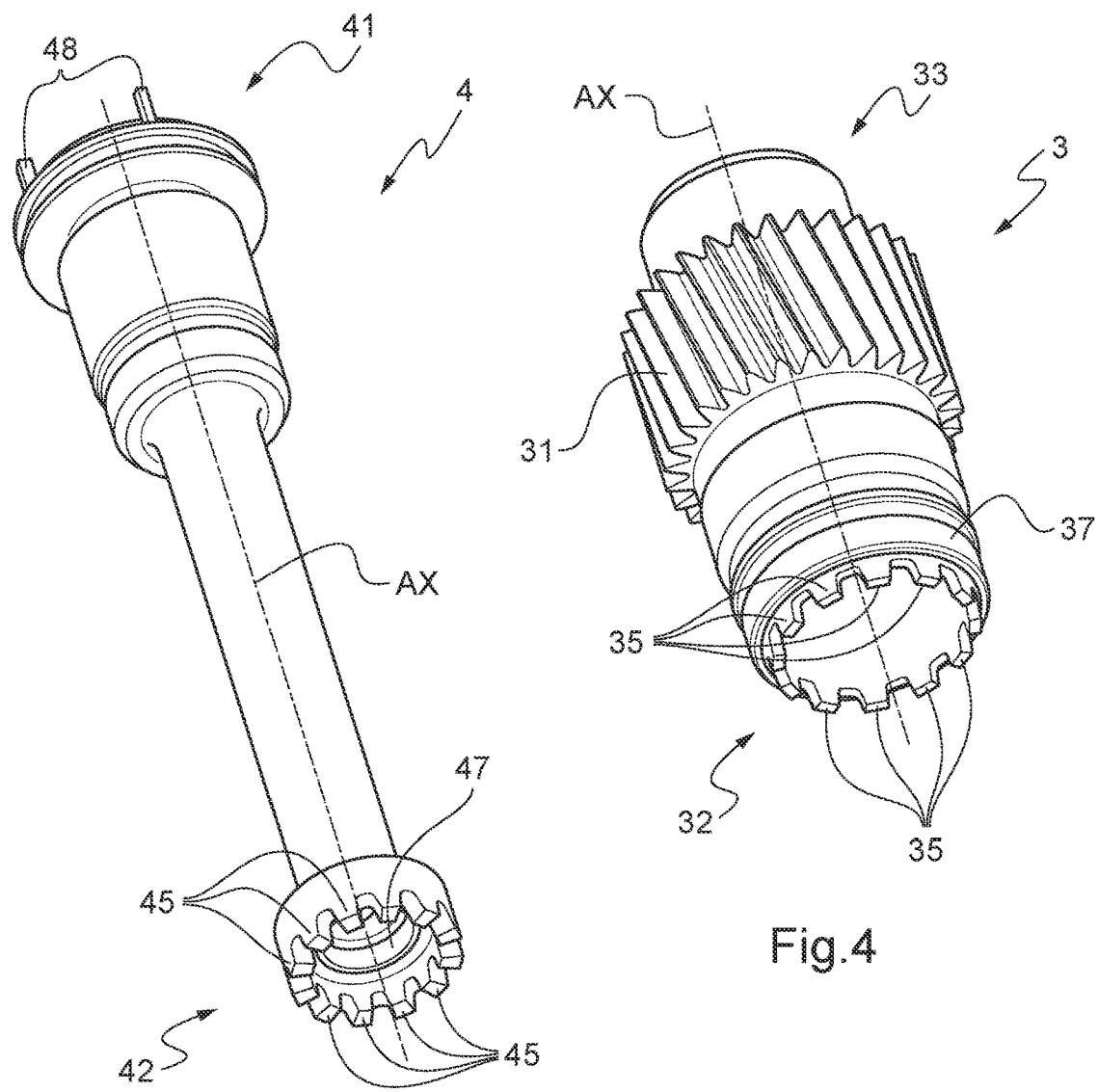
FIG. 3 is a perspective view of an intermediate shaft of the mechanical device according to FIG. 2.
FIG. 4 is a perspective view of a terminal pinion of the mechanical device according to FIG. 2.
Figure 5:
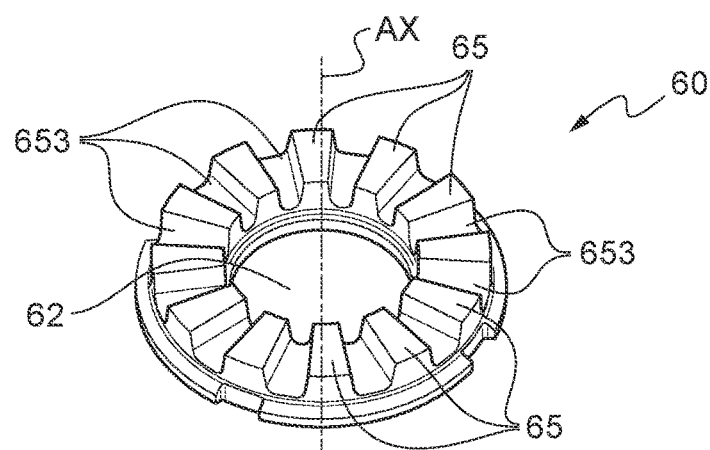
FIG. 5 is a perspective view of a drive ring of the mechanical device according to FIG. 2.

The second mechanical connection 6 secures the intermediate shaft 4 and the terminal pinion 3 in rotation about the rotation axis AX by means of a drive ring 60. Separate perspective views of the intermediate shaft 4, the terminal pinion 3 and the drive ring 60 are shown in FIGS. 3, 4 and 5 respectively.

The intermediate shaft 4 comprises first teeth 45 arranged at the first distal end 42 and a bore emerging at the first distal end 42. This bore comprises a tapped inner cylindrical surface 47. The first teeth 45 extend parallel to the rotation axis AX from a tooth root to a tooth crest.

The terminal pinion 3 comprises a proximal end 33 and a distal end 32 as well as second teeth 35 arranged at the distal end 32 and a threaded outer surface 37 situated in the vicinity of or adjacent to the second teeth 35. The second teeth 35 extend parallel to the rotation axis AX from a tooth root to a tooth crest.

The drive ring 60 comprises connecting teeth 65 separated by radial intertooth spaces 653 and a cylindrical hole 62. The connecting teeth 65 extend parallel to the rotation axis AX from a tooth root to a tooth crest.

The first teeth 45 thus cooperate with the connecting teeth 65 in order to secures the intermediate shaft 4 and the drive ring 60 in rotation. Each first tooth 45 occupies a radial intertooth space 653, being in contact with the connecting teeth 65 in this intertooth space 653. The first teeth 45 and the connecting teeth 65 therefore mesh with each other axially, parallel to the rotation axis AX.

The second teeth 35 cooperate with the connecting teeth 65, the second teeth 35 being positioned around the first teeth 45 with respect to the rotation axis AX, in order to secure the terminal pinion 3 and the drive ring 60 in rotation. Each second tooth 35 occupies a radial intertooth space 653, being in contact with the connecting teeth 65 in this intertooth space 653. The second teeth 35 and the connecting teeth 65 therefore mesh with each other axially, parallel to the rotation axis AX.

The second mechanical connection 6 therefore comprises the first teeth 45, the second teeth 35 and the connecting teeth 65 as well as the drive ring 60 itself.

In the example shown, each intertooth space 653 is situated opposite a first tooth 45 and a second tooth 35 longitudinally along the rotation axis AX. Each intertooth space 653 thus receives a first tooth 45 and a second tooth 35.

The second mechanical connection 6 also comprises a fastening device 66 holding the drive ring 60 with the intermediate shaft 4 and the terminal pinion 3, axially in relation to the rotation axis AX and, consequently, keeping the first teeth 45 and the second teeth 35 in the intertooth spaces 653 and, therefore, in contact with the connecting teeth 65.

The fastening device 66 comprises a screw 67 and a nut 68, which are shown in FIG. 2. The screw 67 comprises a threaded outer cylindrical surface 671 and a head 672. The threaded outer cylindrical surface 671 is configured to be assembled with the tapped inner cylindrical surface 47 of the intermediate shaft 4, this outer cylindrical surface 671 passing through the cylindrical hole 62 of the drive ring 60. The head 672 then abuts against the drive ring 60, thereby holding the drive ring 60 against the intermediate shaft 4. The drive ring 60 is thus positioned between the screw 67 and the intermediate shaft 4.

The nut 68 comprises a tapped inner cylindrical surface 681 and a flange 682. The tapped inner cylindrical surface 681 is configured to be assembled with the threaded outer cylindrical surface 37 of the terminal pinion 3, this inner cylindrical surface 681 being positioned outside the drive ring 60 with respect to the rotation axis AX. The flange 682 then abuts against the drive ring 60, thereby holding the drive ring 60 against the terminal pinion 3. The drive ring 60 is thus positioned between the nut 67 and the terminal pinion 3.

The torquemeter 7 is a torquemeter with a phonic wheel and is used to measure a torque transmitted between the input pinion 2 and the terminal pinion 3. The torquemeter 7 comprises at least one measuring index 48 secured to the intermediate shaft 4 and arranged at the first proximal end 41 and a reference shaft 8 extending longitudinally along the rotation axis AX from a second proximal end 81 to a second distal end 82. The reference shaft 8 is provided with at least one reference index 88 positioned at the second proximal end 81. The measuring index or indexes 48 and the reference index or indexes 88 are preferably arranged such that a first plane P1 perpendicular to the rotation axis AX intersects the measuring index or indexes 48 and the reference index or indexes 88.

Such a measuring index 48 may comprise, for example, a protrusion, such as a tooth protruding from a ring forming the first proximal end 41 of the intermediate shaft 4, or a shape projecting from the side of this ring. Such a measuring index 48 may alternatively comprise a groove in the side of the first proximal end 41 or other recessed shapes.

The reference index 88 may be similar or even identical to the measuring index 48. For example, if the measuring index 48 comprises a protrusion, the reference index 88 also comprises a protrusion. Alternatively, if the measuring index 48 comprises a groove, the reference index 88 also comprises a groove. Furthermore, the reference index or indexes 88 and measuring index or indexes 48 are equal in number. For example, the intermediate shaft 4 may comprise four measuring indexes 48 and the reference shaft 8 may comprise four reference indexes 88 spaced apart at equal intervals around the rotation axis AX.

The reference shaft 8 is coaxial with the intermediate shaft 4 and arranged at least partially inside the intermediate shaft 4. For example, only the reference index or indexes 88 may be arranged outside the intermediate shaft 4, beyond the first proximal end 41. The reference shaft 8 is secured to the intermediate shaft 4 at the second distal end 82, and in the vicinity of the first distal end 42, for example by a flush-mounted connection with zero degrees of freedom.

Therefore, when the terminal pinion 3 is driven by the input pinion 2, the intermediate shaft 4 undergoes torsional deformation between the first mechanical rotational drive connection 5 and the second mechanical connection 6, and therefore substantially between the first proximal end 41 and the first distal end 42, under the effect of the torque transmitted between the input pinion 2 and the terminal pinion 3. The reference shaft 8 is fastened to the intermediate shaft 4 only at the second distal end 82 and is therefore not subject to any deformation, except that induced by the rotational speed of the reference shaft 8 that is very low and may therefore be disregarded. As a result of this, an angular offset is generated between a measuring index 48 and a reference index 88, relative to the positions of this measuring index 48 and reference index 88 when the intermediate shaft 4 and the reference shaft 8 are stationary about the rotation axis AX. This angular offset is a function of the torque transmitted between the input pinion 2 and the terminal pinion 3.

In order to measure this angular offset, the torquemeter 7 may comprise at least one sensor 75 and a calculator 73. The sensor 75 may be configured to measure the relative angular positions of the at least one measuring index 48 and the at least one reference index 88 with respect to the rotation axis AX, for example in the plane P1. Alternatively, the sensor 75 may be configured to measure the absolute angular positions, in a reference frame linked to the mechanical device 1, of the measuring index or indexes 48 and the reference index or indexes 88 with respect to the rotation axis AX, for example in the plane P1. A single sensor 75 may be sufficient. Using several sensors 75 may allow redundancy of measurements and/or the use of an average value of these measurements, for example.

The sensor next transmits to the calculator 73 at least one digital or analog, electrical or optical signal carrying information relating to these angular positions, for example via a wired or wireless link. The calculator 73 processes this information and determines the mechanical torque transmitted between the input pinion 2 and the terminal pinion 3 as a function of the measured angular positions by applying, for example, a predetermined law.

In order to provide an accurate and reliable value for the transmitted torque, the angular offset between a measuring index 48 and a reference index 88 must be significant, for example of the order of several degrees. For this reason, the intermediate shaft 4 must be sufficiently long, this length being determined according to the torque to be transmitted and therefore measured, and the targeted angular offset. The length of the intermediate shaft 4 may then become a dimensional characteristic of the mechanical device 1 or indeed the main gearbox 100.

Figure 6:
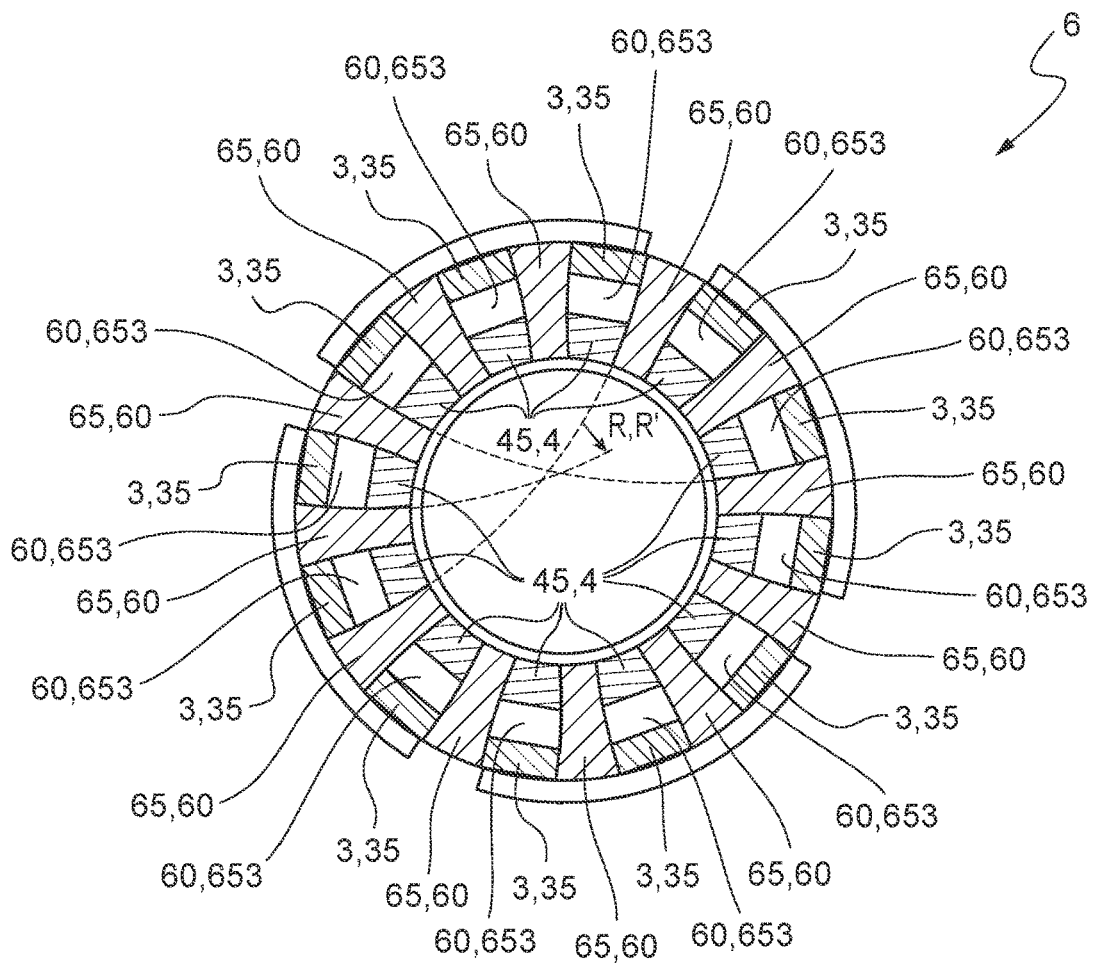
FIG. 6 is a cross-sectional view of the second mechanical connection of the mechanical device according to FIG. 2.

FIG. 6 is a cross-sectional view, perpendicular to the rotation axis AX, of the second mechanical connection 6 of the mechanical device 1 shown in FIG. 2. Each intertooth space 653 receives a first tooth 45 and a second tooth 35. Furthermore, according to this example, the first teeth 45 and the second teeth 35 are concave, whereas the connecting teeth 65 are convex. The radii R, R' of these concave and convex shapes are equal. Therefore, the shapes of these first and second teeth 45, 35 are identical and are complementary to the shape of the connecting teeth 65, thus allowing the second mechanical connection 6 to function in an optimal manner.

Alternatively, the first teeth 45 and the second teeth 35 may be convex and the connecting teeth 65 may be concave.

Figure 7:
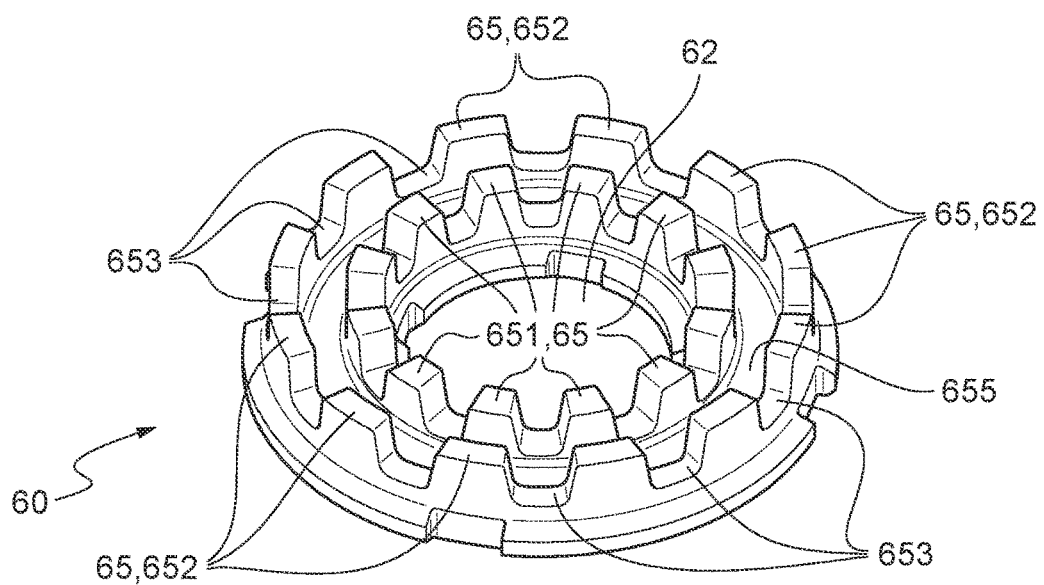
FIG. 7 is a perspective view of a variant of the drive ring.

FIG. 7 is a perspective view of a variant of the drive ring 6. According to this variant, each connecting tooth 65 radially comprises two teeth 651, 652 separated by a separation space 655. The two teeth 651, 652 comprise an inner connecting tooth 651 and an outer connecting tooth 652 situated outside the inner connecting teeth 651 with respect to the rotation axis AX. The inner connecting teeth 651 thus cooperate with the first teeth 45 whereas the outer connecting teeth 652 cooperate with the second teeth 35.

Moreover, the first teeth 45, the second teeth 35 and the connecting teeth 65 each extend in azimuth with respect to the rotation axis AX between two inclined faces. Each of the faces is, for example, inclined by an angle of between 5° and 15° in relation to a direction parallel to the rotation axis AX in order, in particular, to have a sufficient number of first and second teeth 45, 35 and connecting teeth 65 to transmit the expected torque between the input pinion 2 and the terminal pinion 3.

Figure 8:
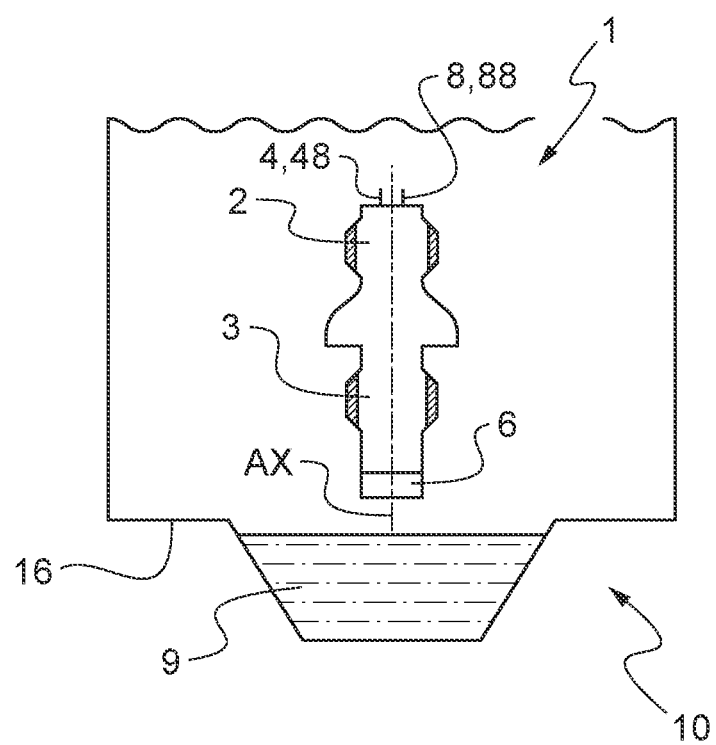
FIG. 8 is a cross-sectional view of a gearbox according to the disclosure.

Finally, FIG. 8 is a cross-sectional view of an example of a gearbox 10. This gearbox 10 comprises a housing 16 in which the mechanical device 1 and other rotating components and reduction devices (not shown) are arranged and at the bottom of which there is a lubricating liquid 9 intended to lubricate the various rotating components and reduction devices.

Due to the small space requirement of the second mechanical connection 6, in particular parallel to the rotation axis AX and despite the presence of the torquemeter 7, the second mechanical connection 6 may be positioned above the lubricating liquid 9 when the gearbox 10 is in operation and is in a reference position. In an aircraft 100, this reference position is reached, for example, when the aircraft 100 is standing on horizontal ground in a terrestrial reference frame.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A mechanical device comprising an input pinion and a terminal pinion that are able to rotate about a rotation axis, an intermediate shaft extending longitudinally along the rotation axis from a first proximal end to a first distal end, a first mechanical rotational drive connection connecting the intermediate shaft and the input pinion, a second mechanical connection connecting the first distal end of the intermediate shaft and the terminal pinion, the mechanical device comprising a torquemeter cooperating with the intermediate shaft, wherein:
the torquemeter is a torquemeter with a phonic wheel provided with a reference shaft extending longitudinally along the rotation axis from a second proximal end to a second distal end, the reference shaft being arranged at least partially inside the intermediate shaft and being coaxial to the intermediate shaft, the second distal end of the reference shaft being connected to the intermediate shaft, the torquemeter comprising at least one measuring index secured to the intermediate shaft and arranged at the first proximal end and at least one reference index secured to the reference shaft and arranged at the second proximal end;
the intermediate shaft is coaxial with the input pinion and with the terminal pinion about the rotation axis; and
the second mechanical connection comprises a series of first teeth arranged on the first distal end of the intermediate shaft and a series of second teeth arranged on the terminal pinion, around the first teeth with respect to the rotation axis, a drive ring comprising a series of connecting teeth separated by radial intertooth spaces, each first tooth and each second tooth being in contact with the connecting teeth in a radial intertooth space, and a fastening device connecting the drive ring axially along the rotation axis with the intermediate shaft and the terminal pinion.

2. The mechanical device according to claim 1,
wherein the first mechanical rotational drive connection is a permanent connection.

3. The mechanical device according to claim 1,
wherein the first mechanical rotational drive connection is a disengageable connection.

4. The mechanical device according to claim 3,
wherein the first mechanical rotational drive connection comprises a free-wheel allowing the intermediate shaft to be driven only in a single direction of rotation about the rotation axis by the input pinion.

5. The mechanical device according to claim 1,
wherein each first tooth, each second tooth and each connecting tooth extends parallel to the rotation axis from a tooth root to a tooth crest.

6. The mechanical device according to claim 1,
wherein the first teeth and the second teeth are convex and the connecting teeth are concave or the first teeth and the second teeth are concave and the connecting teeth are convex in a plane perpendicular to the rotation axis.

7. The mechanical device according to claim 1,
wherein the first teeth, the second teeth and the connecting teeth each extend in azimuth with respect to the rotation axis between two inclined faces, each of the faces being inclined by an angle of between 5° and 15° in relation to a direction parallel to the rotation axis.

8. The mechanical device according to claim 1,
wherein each intertooth space receives a first tooth and a second tooth.

9. The mechanical device according to claim 1,
wherein each connecting tooth radially comprises two teeth separated by a separation space, the two teeth comprising an inner connecting tooth and an outer connecting tooth, the outer connecting teeth being situated around the inner connecting teeth with respect to the rotation axis, the inner connecting teeth cooperating with the first teeth and the outer connecting teeth cooperating with the second teeth.

10. The mechanical device according to claim 1,
wherein the fastening device comprises a screw and a nut, the screw comprising a threaded outer cylindrical surface cooperating with a tapped inner cylindrical surface of the intermediate shaft, the drive ring being arranged between the screw and the intermediate shaft, the nut comprising a tapped inner cylindrical surface cooperating with a threaded outer surface of the terminal pinion, the drive ring being arranged between the nut and the terminal pinion.

11. The mechanical device according to claim 1,
wherein the torquemeter comprises a sensor and a calculator, the sensor being configured to measure relative angular positions of the measuring index(es) and the reference index(es) with respect to the rotation axis, the calculator being configured to determine a mechanical torque transmitted between the input pinion and the terminal pinion as a function of the relative angular positions.

12. The mechanical device according to claim 1,
wherein the measuring index(es) and the reference index(es) are arranged in a first plane perpendicular to the rotation axis.

13. The mechanical device according to claim 1,
wherein the intermediate shaft is arranged at least partially inside the input pinion and the terminal pinion.

14. The mechanical device according to claim 1,
wherein the reference shaft is connected to the intermediate shaft by a flush-mounted connection.

15. A gearbox comprising the mechanical device according to claim 1.

16. The gearbox according to claim 15,
the gearbox comprising a housing wherein the mechanical device is arranged and at the bottom of which there is a lubricating liquid, the second mechanical connection being positioned above the lubricating liquid when the gearbox is in a reference position.

17. An aircraft comprising the gearbox according to claim 1,
wherein the gearbox is arranged between at least one engine and at least one rotor of the aircraft.

* * * * *